United States Patent
Wnek et al.

(10) Patent No.: US 8,252,217 B2
(45) Date of Patent: *Aug. 28, 2012

(54) CONTAINER WITH INJECTION-MOLDED FEATURE AND TOOL FOR FORMING CONTAINER

(75) Inventors: Patrick H. Wnek, Sherwood, WI (US); James B. Kluz, Clintonville, WI (US); Ronald P. Marx, Freemont, WI (US)

(73) Assignee: Graphic Packaging International, Inc., Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/117,424

(22) Filed: May 27, 2011

(65) Prior Publication Data
US 2011/0227250 A1 Sep. 22, 2011

Related U.S. Application Data

(62) Division of application No. 12/062,549, filed on Apr. 4, 2008, now Pat. No. 7,975,871.

(51) Int. Cl.
*B29C 70/76* (2006.01)
*B29C 45/14* (2006.01)
*B29C 69/02* (2006.01)

(52) U.S. Cl. .................. 264/252; 264/266; 264/328.12; 425/112; 425/125

(58) Field of Classification Search .................. 425/112, 425/116, 125, 129.1; 264/252, 266, 328.12
See application file for complete search history.

(56) References Cited

U.S. PATENT DOCUMENTS

| | | | |
|---|---|---|---|
| 2,328,563 | A | 9/1943 | Lichter |
| 2,522,397 | A | 9/1950 | Palmer |
| 2,634,880 | A | 4/1953 | Gravatt |
| 3,040,949 | A | 6/1962 | Foote |
| 3,099,377 | A | 7/1963 | Metzler et al. |
| 3,119,540 | A | 1/1964 | Schenk et al. |

(Continued)

FOREIGN PATENT DOCUMENTS

EP 0082209 6/1983

(Continued)

OTHER PUBLICATIONS

International Search Report and Written Opinion for PCT/US2008/088408 mailed Aug. 14, 2009.

(Continued)

*Primary Examiner* — Robert B Davis
(74) *Attorney, Agent, or Firm* — Womble Carlyle Sandridge & Rice, LLP (57) ABSTRACT

A container has a base panel, at least one side panel extending upwardly from the base panel, and at least one end panel extending upwardly from the base panel. At least one corner is formed at a junction between the side panel and end panel. A flange extends laterally outward from the upper edges of at least one of the side panel, end panel, and corner. An injection-molded structure extends along at least a portion of the flange, the injection-molded structure includes a base portion adjacent the upper edges of the side wall and the end wall, a distal portion extending laterally outward from the base portion, and an indentation in the distal portion extending along at least a portion of the flange of the container. An apparatus for forming the container and a method of manufacturing are also disclosed.

15 Claims, 8 Drawing Sheets

U.S. PATENT DOCUMENTS

| | | | |
|---|---|---|---|
| 3,135,455 A | 6/1964 | Santangelo | |
| 3,144,167 A | 8/1964 | Schultz | |
| 3,154,617 A | 10/1964 | Schenk et al. | |
| 3,190,530 A | 6/1965 | Edwards | |
| 3,286,876 A | 11/1966 | Ring | |
| 3,511,902 A * | 5/1970 | Santangelo | 264/163 |
| 3,680,733 A | 8/1972 | Winslow | |
| 3,684,633 A | 8/1972 | Haase | |
| 3,765,976 A | 10/1973 | Nasica | |
| 3,785,544 A | 1/1974 | Smith | |
| 3,834,606 A | 9/1974 | Andersson | |
| 3,967,731 A | 7/1976 | Boduch | |
| 3,973,689 A | 8/1976 | Sutch | |
| 4,001,471 A | 1/1977 | Rumball | |
| 4,079,851 A | 3/1978 | Valyi | |
| 4,123,214 A * | 10/1978 | Sutch | 425/129.1 |
| 4,139,115 A | 2/1979 | Robinson | |
| 4,149,838 A * | 4/1979 | Sutch | 425/112 |
| 4,183,435 A | 1/1980 | Thompson et al. | |
| 4,312,451 A | 1/1982 | Forbes, Jr. | |
| 4,404,162 A | 9/1983 | Miki et al. | |
| 4,489,120 A | 12/1984 | Hollinger, Jr. | |
| 4,533,065 A | 8/1985 | Chazal et al. | |
| 4,533,312 A | 8/1985 | Von Holdt | |
| 4,606,496 A | 8/1986 | Marx et al. | |
| 4,609,140 A | 9/1986 | Van Handel et al. | |
| 4,704,510 A | 11/1987 | Matsui | |
| 4,721,499 A | 1/1988 | Marx et al. | |
| 4,775,771 A | 10/1988 | Pawlowski et al. | |
| 4,865,921 A | 9/1989 | Hollenberg et al. | |
| 4,890,439 A | 1/1990 | Smart et al. | |
| 4,935,089 A | 6/1990 | Schirmer | |
| 4,936,935 A | 6/1990 | Beckett | |
| 4,963,424 A | 10/1990 | Beckett | |
| 5,039,364 A | 8/1991 | Beckett et al. | |
| 5,117,078 A | 5/1992 | Beckett | |
| 5,183,706 A | 2/1993 | Bekele | |
| 5,190,209 A | 3/1993 | Gordon et al. | |
| 5,213,902 A | 5/1993 | Beckett | |
| 5,219,461 A | 6/1993 | Hyll et al. | |
| 5,221,419 A | 6/1993 | Beckett | |
| 5,260,537 A | 11/1993 | Beckett | |
| 5,266,386 A | 11/1993 | Beckett | |
| 5,269,717 A | 12/1993 | Tardif | |
| RE34,683 E | 8/1994 | Maynard et al. | |
| 5,335,847 A | 8/1994 | Lisiecki | |
| 5,340,436 A | 8/1994 | Beckett | |
| 5,354,973 A | 10/1994 | Beckett | |
| 5,410,135 A | 4/1995 | Pollart et al. | |
| 5,424,517 A | 6/1995 | Habeger, Jr. et al. | |
| 5,506,036 A | 4/1996 | Bergerious | |
| 5,519,195 A | 5/1996 | Keefer et al. | |
| 5,565,228 A | 10/1996 | Gics | |
| 5,628,921 A | 5/1997 | Beckett | |
| 5,672,407 A | 9/1997 | Beckett | |
| 5,676,276 A | 10/1997 | Zielinski et al. | |
| 5,758,773 A | 6/1998 | Clements | |
| 5,759,422 A | 6/1998 | Schmelzer et al. | |
| 5,800,724 A | 9/1998 | Habeger et al. | |
| 5,934,472 A | 8/1999 | Ramirez et al. | |
| 6,114,679 A | 9/2000 | Lai et al. | |
| 6,149,006 A | 11/2000 | Brauner et al. | |
| 6,150,646 A | 11/2000 | Lai et al. | |
| 6,204,492 B1 | 3/2001 | Zeng et al. | |
| 6,251,451 B1 | 6/2001 | Zeng | |
| 6,308,831 B1 | 10/2001 | Saxe et al. | |
| 6,414,290 B1 | 7/2002 | Cole et al. | |
| 6,433,322 B2 | 8/2002 | Zeng et al. | |
| 6,455,827 B2 | 9/2002 | Zeng | |
| 6,552,315 B2 | 4/2003 | Zeng et al. | |
| 6,667,004 B2 * | 12/2003 | Cha et al. | 264/484 |
| 6,677,563 B2 | 1/2004 | Lai | |
| 6,682,675 B1 | 1/2004 | Vandangeot et al. | |
| 6,682,676 B1 | 1/2004 | Renault et al. | |
| 6,717,121 B2 | 4/2004 | Zeng et al. | |
| 6,765,182 B2 | 7/2004 | Cole et al. | |
| 6,790,026 B2 | 9/2004 | Vandangeot et al. | |
| 6,823,624 B2 | 11/2004 | Proserpio | |
| 6,981,863 B2 | 1/2006 | Renault et al. | |
| 6,988,654 B2 | 1/2006 | Wnek | |
| 7,000,825 B2 | 2/2006 | Alexander et al. | |
| 7,019,271 B2 | 3/2006 | Wnek et al. | |
| 7,311,868 B2 * | 12/2007 | Ek et al. | 264/268 |
| 7,323,669 B2 | 1/2008 | Robison et al. | |
| 7,351,942 B2 | 4/2008 | Wnek et al. | |
| 7,365,292 B2 | 4/2008 | Cole et al. | |
| 7,476,830 B2 | 1/2009 | Middleton et al. | |
| 7,541,562 B2 | 6/2009 | Cole et al. | |
| 2002/0092791 A1 | 7/2002 | Wnek | |
| 2003/0004003 A1 | 1/2003 | Lochtefeld | |
| 2003/0014912 A1 | 1/2003 | Proserpio | |
| 2004/0239005 A1* | 12/2004 | Ek et al. | 264/328.12 |
| 2004/0262322 A1 | 12/2004 | Middleton et al. | |
| 2005/0109653 A1 | 5/2005 | Wnek et al. | |
| 2006/0198972 A1 | 9/2006 | Ueda et al. | |
| 2007/0081743 A1 | 4/2007 | Kim | |
| 2007/0194029 A1 | 8/2007 | Middleton et al. | |
| 2007/0251943 A1 | 11/2007 | Wnek et al. | |
| 2007/0262487 A1 | 11/2007 | O'Hagan | |
| 2007/0267374 A1 | 11/2007 | Middleton et al. | |
| 2008/0000896 A1 | 1/2008 | Lafferty et al. | |
| 2008/0073339 A1 | 3/2008 | Lamarche | |
| 2008/0164178 A1 | 7/2008 | Wnek et al. | |
| 2009/0223952 A1 | 9/2009 | Wnek et al. | |
| 2009/0250372 A1 | 10/2009 | Wnek et al. | |

FOREIGN PATENT DOCUMENTS

| | | |
|---|---|---|
| EP | 0 156 000 | 10/1985 |
| EP | 0 816 239 A1 | 7/1988 |
| EP | 0 844 972 | 7/2002 |
| EP | 1332972 | 8/2003 |
| FR | 1006970 | 1/1952 |
| FR | 1 288 503 | 3/1962 |
| FR | 2677915 | 12/1992 |
| FR | 2733715 | 11/1996 |
| FR | 2806346 | 9/2001 |
| FR | 2806347 | 9/2001 |
| GB | 1348370 | 3/1974 |
| GB | 1 487 825 | 10/1977 |
| GB | 1 502 266 | 3/1978 |
| GB | 2171048 | 8/1986 |
| JP | 47 23456 | 10/1972 |
| JP | 53-8574 | 3/1978 |
| JP | 54-226059 | 9/1979 |
| JP | 54-126887 | 10/1979 |
| JP | 5665866 | 6/1981 |
| JP | 59-075004 | 4/1984 |
| JP | 60-96234 | 7/1985 |
| JP | 3004582 | 1/1991 |
| JP | 3057020 | 5/1991 |
| JP | 6000843 | 1/1994 |
| JP | 07 28833 | 5/1995 |
| JP | 08-119271 | 5/1996 |
| JP | 08-156944 | 6/1996 |
| JP | 08 256944 | 6/1996 |
| JP | 08 8282647 | 10/1996 |
| JP | 08-337235 | 12/1996 |
| JP | 09-254948 | 9/1997 |
| JP | 2000 43840 | 2/2000 |
| JP | 2001 213420 | 2/2000 |
| JP | 2000 142825 | 5/2000 |
| JP | 2000 238760 | 9/2000 |
| JP | 2000 335550 | 12/2000 |
| JP | 2001 328617 | 11/2001 |
| JP | 2006-513108 | 4/2006 |
| JP | 2007-111888 A | 5/2007 |
| KR | 20-1999-023720 U | 7/1999 |
| KR | 10-0360299 B1 | 11/2002 |
| WO | WO 94/01276 | 1/1994 |
| WO | WO9408777 | 4/1994 |
| WO | WO03066435 A2 | 8/2003 |
| WO | WO 03/078012 A1 | 9/2003 |
| WO | WO 2004/033324 A1 | 4/2004 |
| WO | WO 2007/106367 A2 | 9/2007 |
| WO | WO 2008/049048 A2 | 4/2008 |
| WO | WO2009086501 A2 | 7/2009 |
| WO | WO2009088904 A2 | 7/2009 |

OTHER PUBLICATIONS

International Search Report and Written Opinion for PCT/US2008/088605 mailed Jul. 27, 2009.
Notification of Reason for Refusal for JP 2010-540948 dated Jan. 30, 2012.
Supplementary European Search Report for EP 08 86 8990 dated Jan. 25, 2012.
Communication from EPO for EP 07 752 640.8 dated Mar. 1, 2010.
Notice of Reason for Rejection for JP 2009-500389 dated Jul. 4, 2011 and English Translation.
Supplementary European Search Report for EP 09 75 5313 dated Jan. 25, 2012.
International Search Report and Written Opinion for related PCT application No. PCT/US2009/035986, filed Mar. 4, 2009.
Restriction requirement dated Feb. 4, 2010 for related U.S. Appl. No. 12/062,549.
Response to Restriction requirement dated Feb. 17, 2010 for related U.S. Appl. No. 12/062,549.
Office Action dated May 19, 2010 for related U.S. Appl. No. 12/062,549.
Amendment and Request for 1-month extension of time dated Sep. 20, 2010 for related U.S. Appl. No. 12/062,549.
Final Office Action dated Dec. 6, 2010 for related U.S. Appl. No. 12/062,549.
Response to Final Office Action dated Feb. 24, 2011 for related U.S. Appl. No. 12/062,549.
International Search Report for related PCT application No. PCT/US2007/005956, dated Dec. 5, 2007.
Written Opinion for related PCT application No. PCT/US2007/005956, dated Sep. 16, 2008.
Supplemental European Search Report for related EP application EP 03 77 6279, Jan. 28, 2009.

\* cited by examiner

CONTAINER WITH INJECTION-MOLDED FEATURE AND TOOL FOR FORMING CONTAINER

CROSS-REFERENCE TO RELATED APPLICATION

This application is a divisional of U.S. patent application Ser. No. 12/062,549, filed Apr. 4, 2008.

INCORPORATION BY REFERENCE

The entire contents of U.S. patent application Ser. No. 12/062,549, filed Apr. 4, 2008 is hereby incorporated by reference as if presented herein in their entirety.

BACKGROUND OF THE DISCLOSURE

The present disclosure generally relates to composite constructs and, more particularly, the present invention relates to containers with injection-molded features.

BRIEF SUMMARY OF SOME ASPECTS OF THE DISCLOSURE

In one aspect, the disclosure is generally directed to a container comprising a plurality of panels that extends at least partially around and at least partially defines a cavity of the container. The plurality of panels comprises a base panel, at least one side panel extending upwardly from the base panel, and at least one end panel extending upwardly from the base panel. At least one corner is formed at a junction between the side panel and end panel. A flange extends laterally outward from an upper edge of at least one of the side panel, end panel, and corner. An injection-molded structure extends along at least a portion of the flange. The injection-molded structure includes a base portion adjacent the upper edge, a distal portion extending laterally outward from the base portion to an edge of the injection-molded structure, and an indentation in the distal portion extending along at least a portion of the flange of the container.

In another aspect, the disclosure is generally directed to an apparatus for at least partially forming a container from a blank. The container has a flange extending around a top of the container. The apparatus comprises a female mold that includes a cavity for at least partially receiving the blank. A male mold is operatively associated with the female mold. The male mold is operable to move within the cavity to least partially form the blank into the container. An injection cavity is respectively formed between cooperating surfaces of the female mold and the male mold. The injection cavity is for receiving material for forming an injection-molded structure extending along at least a portion of the flange. A protrusion is on at least one of the cooperating surfaces of the female mold and the male mold. The protrusion is for positioning the flange prior to forming the injection-molded structure.

In another aspect, the disclosure is generally directed to a method of manufacturing a container. The method comprises closing a blank in a forming tool so that the blank is formed into a container that is at least partially contained in the closed forming tool. The forming tool comprises a female mold that includes a cavity and a male mold operatively associate with the female mold. The female mold and the male mold have respectively opposed cooperating surfaces that respectively form an injection cavity. At least one of the cooperating surfaces has a protrusion. The closing of the blank in the forming tool comprises engaging a first part of the male mold against a portion of the blank, and thereafter, using at least the first part of the male mold to at least partially force the portion of the blank into the cavity of the female mold to partially form the container. The closing of the blank further comprising closing the forming tool to form a flange of the container and engaging the flange with the protrusion to force the flange against one of the cooperating surfaces. The closing of the forming tool forms an injection cavity between the cooperating surfaces. The method of manufacture further comprises forming an injection-molded structure by flowing injection-molded material into the injection cavity.

In another aspect, the disclosure is generally directed to a container comprising a base panel and at least one side panel extending upwardly from the base panel. The base panel and at least one side panel at least partially define a cavity of the container. A flange extends laterally outward from an upper edge of the at least one side panel. An injection-molded structure extends along at least a portion of the flange. The injection-molded structure includes a base portion adjacent the upper edge, a distal portion extending laterally outward from the base portion to an edge of the injection-molded structure, and an indentation in the distal portion extending along at least a portion of the flange of the container.

According to common practice, the various features of the drawings discussed below are not necessarily drawn to scale. Dimensions of various features and elements in the drawings may be expanded or reduced to more clearly illustrate the embodiments of the invention.

BRIEF DESCRIPTION OF THE DRAWINGS

In the following, reference is made to the accompanying drawings that are listed below. The drawings illustrate exemplary embodiments of the present invention, and they are not necessarily drawn to scale.

DETAILED DESCRIPTION OF EXEMPLARY EMBODIMENTS

In the following, exemplary embodiments of the present invention are described in greater detail with reference to the above-mentioned drawings, in which like numerals refer to like parts throughout the several views.

Figure 1:
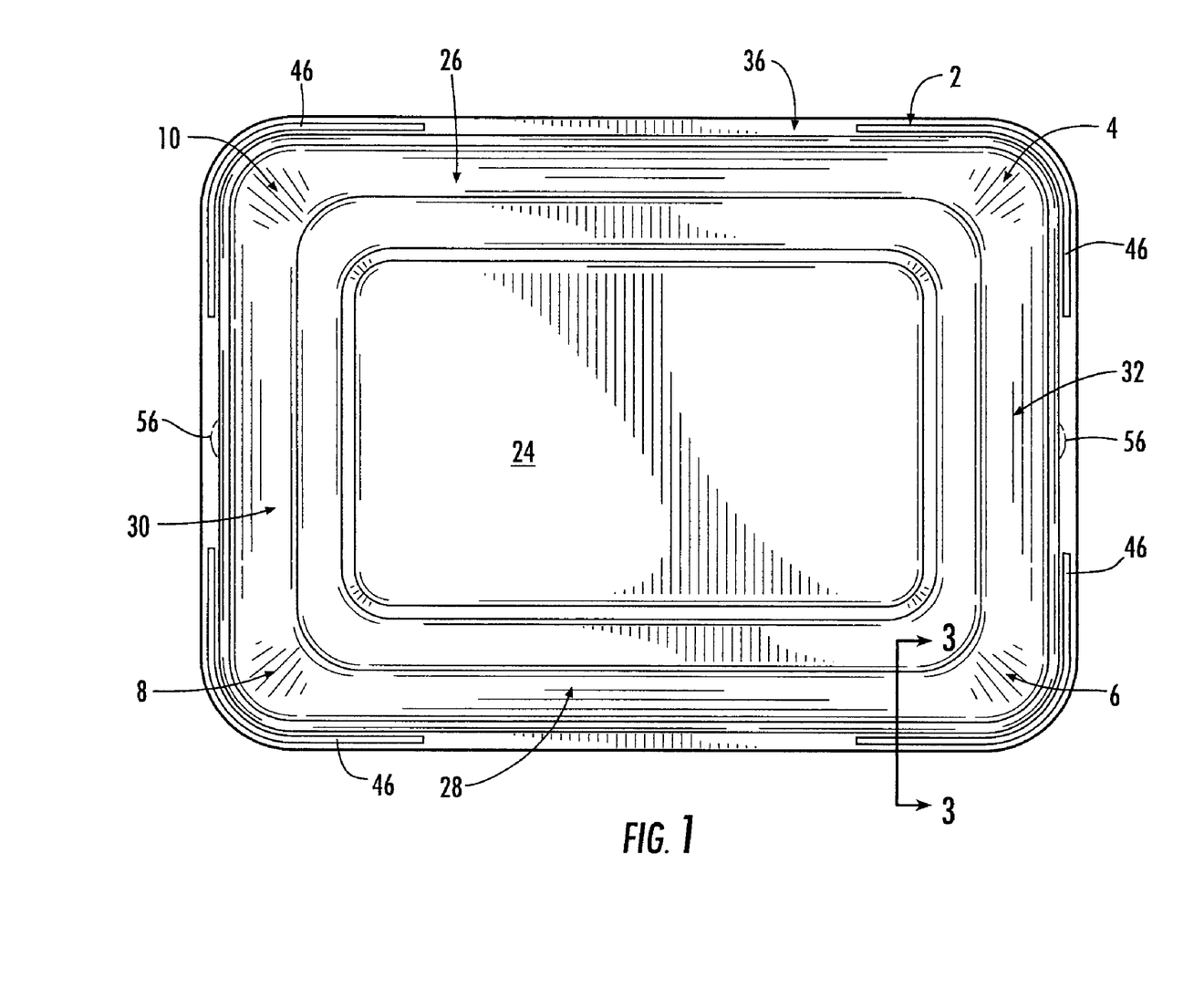
FIG. 1 is a bottom perspective view of container in accordance with one exemplary embodiment of the present invention.

FIG. 1 illustrates a construct, namely a container 2, that can be formed from a generally flat blank (not shown), in accordance with one exemplary embodiment of the present invention. As best understood with reference to FIG. 1, the container 2 comprises a base panel 24, two side panels 26, 28 respectively upwardly folded relative to the base panel, and two end panels 30, 32 upwardly folded relative to the base panel. In the illustrated embodiment, the container 2 is generally a tray having an open top 5 and four rounded corners 4, 6, 8, 10 at respective junctions between the side panels 26, 28 and end panels 30, 32. The base panel 24, side panels 26, 28, end panels 30, 32, and rounded corners 4, 6, 8, 10 form a cavity 9 (FIG. 3) for receiving a food product or other substance.

In the illustrated embodiment, the container 2 and cavity 9 formed therein are generally rectangular. The container 2 may be other shapes (e.g. circular) without departing from the invention. Furthermore, the corners 4, 6, 8, 10 of the illustrated embodiment are formed corners that are press-formed during formation of the container 2. The container 2 may have corners that are otherwise formed. For example, one or more of the corners 4, 6, 8, 10 may be formed as overlapping corners such as is described in co-assigned U.S. patent application Ser. No. 11/715,718, filed Mar. 8, 2007 ("the '718 application"), now U.S. Pat. No. 8,124,201, the entire contents of which is incorporated by reference herein for all purposes.

In the illustrated embodiment, the container 2 includes a flange 36 formed at the upper edges of the side panels 26, 28, end panels 30, 32, and corners 4, 6, 8, 10. The flange 36 extends laterally outward from respective upper edges of the side panels 26, 28, end panels 30, 32, and corners 4, 6, 8, 10 to form a top edge of the container. During formation of the container 2 from a flat blank, the paperboard can overlap at the corners 4, 6, 8, 10 so as to cause the accumulation of excess paperboard into folds or pleats (not shown) which are then compressed when the container is further formed. In the illustrated embodiment, the pleats allow portions of the paperboard material to overlap and bend during the forming process to form the desired curved shape of the corners 4, 6, 8, 10.

Figure 3:
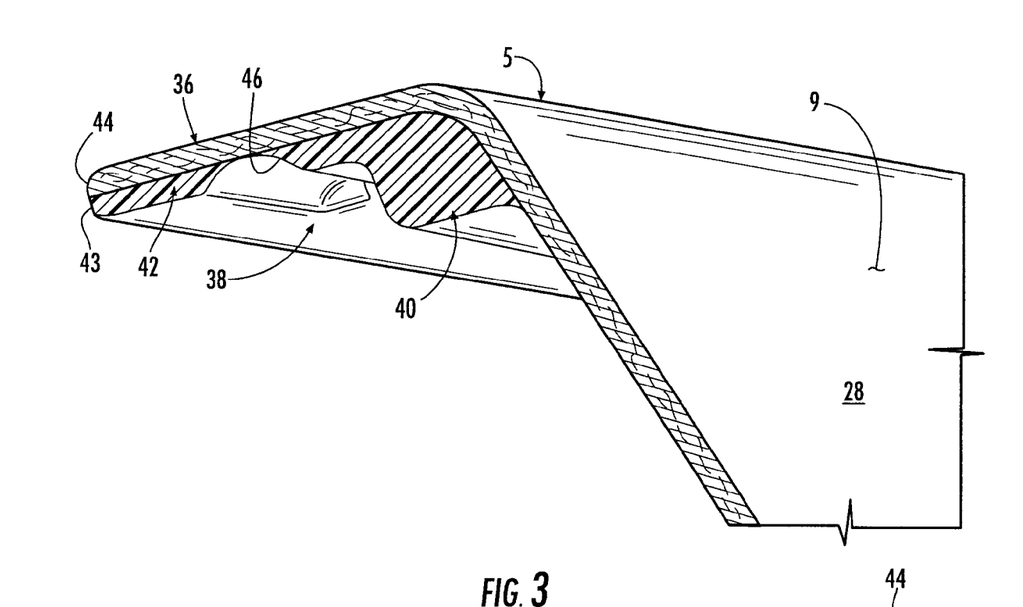
FIG. 3 is a perspective of a partial cross-section of the container taken along the plane including line 3-3 of FIG. 1.
Figure 4:
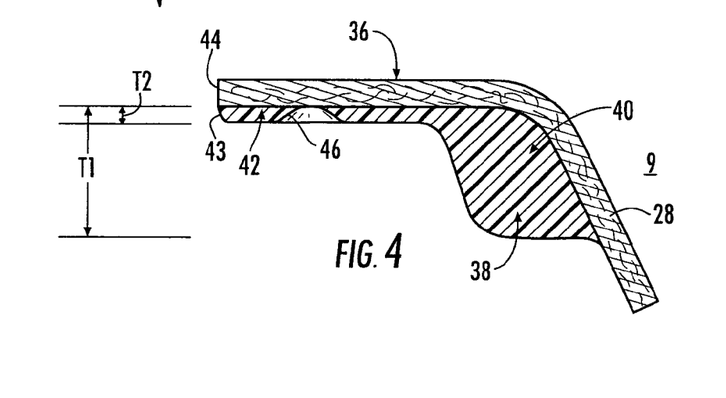
FIG. 4 is a portion of FIG. 3 shown in cross-section.

In one embodiment, the container 2 includes an injection-molded structure 38 extending around the perimeter of the container on the underside of the flange 36. The structure 38 is typically constructed of polymeric material; however, the structure can also be constructed of other types of materials. In the illustrated embodiment, the structure 38 extends around the perimeter of the container 2 and increases the rigidity of the container. As shown in FIGS. 3 and 4, the structure 38 includes a base portion 40 adjacent the upper edges of the side panels 26, 28 (or end panels 30, 32) and a distal portion 42 extending laterally outward from the base portion. In one embodiment, the base portion 40 has a maximum thickness T1 (FIG. 4) that is greater than the maximum thickness T2 of the distal portion 42. In the illustrated embodiment, the distal portion 42 extends laterally outward to a lateral edge 43 of the injection-molded structure 38. The lateral edge 43 of the structure 38 generally coincides with the lateral edge 44 of the flange 36. In other embodiments, the distal portion 42 of the injection-molded structure 38 can extend laterally outward beyond the edge 44 of the flange 36 or the distal portion could partially extend to a location that is laterally inward of the free edge of the flange such that the flange extends beyond the edge of the injection-molded structure 38.

In portions of the structure 38 generally corresponding to the perimeters of the corners 4, 6, 8, 10 of the container 2, the distal portion 42 includes an indentation 46. In the illustrated embodiment, each indentation 46 is laterally spaced inward from the edge 44 of the flange 36 (and the edge 43 of injection-molded structure 38) and is laterally spaced outward from the base portion 40 of the injection-molded structure. As shown in FIG. 1, each indentation 46 is an elongate groove and respectively extends around a portion of the perimeter of the container 2. In the illustrated embodiment, each indentation 46 generally corresponds to the corners 4, 6, 8, 10 and partially extends into portions of the perimeter corresponding to one of the side panels 26, 28 and end panels 30, 32. The indentations 46 may be otherwise shaped, arranged, and/or located without departing from the invention. Further, the container 2 can have more or less than four indentations 46 (e.g., a single indentation extending around the perimeter of the container) without departing from the invention.

The container 2 can be formed from a laminate that includes more than one layer, but alternatively the laminate can be replaced with a single ply of material, such as, but not limited to, paperboard, cardboard, paper or a polymeric sheet. In accordance with the exemplary embodiments of the present invention, the laminate can includes a polymer film or an extruded polymer coating that is supported by, and secured to, a substrate that can be in the form of cardboard, paperboard or any other suitable material. Alternatively, the paperboard and polymer film can be replaced with any other suitable materials, for example such that the substrate of the present invention is not limited to paperboard or the like. Nonetheless and in accordance with the exemplary embodiments, the substrate typically is a clay-coated paperboard. As should be apparent, the paperboard can be more generally characterized as a substrate, and a suitable substrate can include paperboard with or without typical supplemental materials, such as coatings that can include clay coatings, colorants, indicia and the like. Further, the container 2 can include other materials, laminates, substrates, etc. such as the materials disclosed in the '718 application, the entire contents of which is incorporated by reference herein for all purposes. The container 2 can include microwave energy interactive material such as the microwave interactive material described in the '718 application. The container 2 may include other microwave energy interactive materials or other materials without departing from the invention.

An acceptable method for manufacturing the container will be discussed in greater detail below (e.g., with reference to a mold assembly 130 shown in FIGS. 5 and 7). Nonetheless, some aspects associated with an exemplary method of manufacturing the container 2 are illustrated in FIG. 1 and will, therefore, now be briefly discussed with reference to FIG. 1. Minor imperfections 56 in the injection-molded structure 38 result from the structure being manufactured from molding material, namely polymeric material, that is injected into a mold. That is, the imperfections 56 located at ends of the container 2 correspond to locations where the liquid molding material is injected (e.g., via valve gates 210 shown in FIG. 7).

Figure 2:
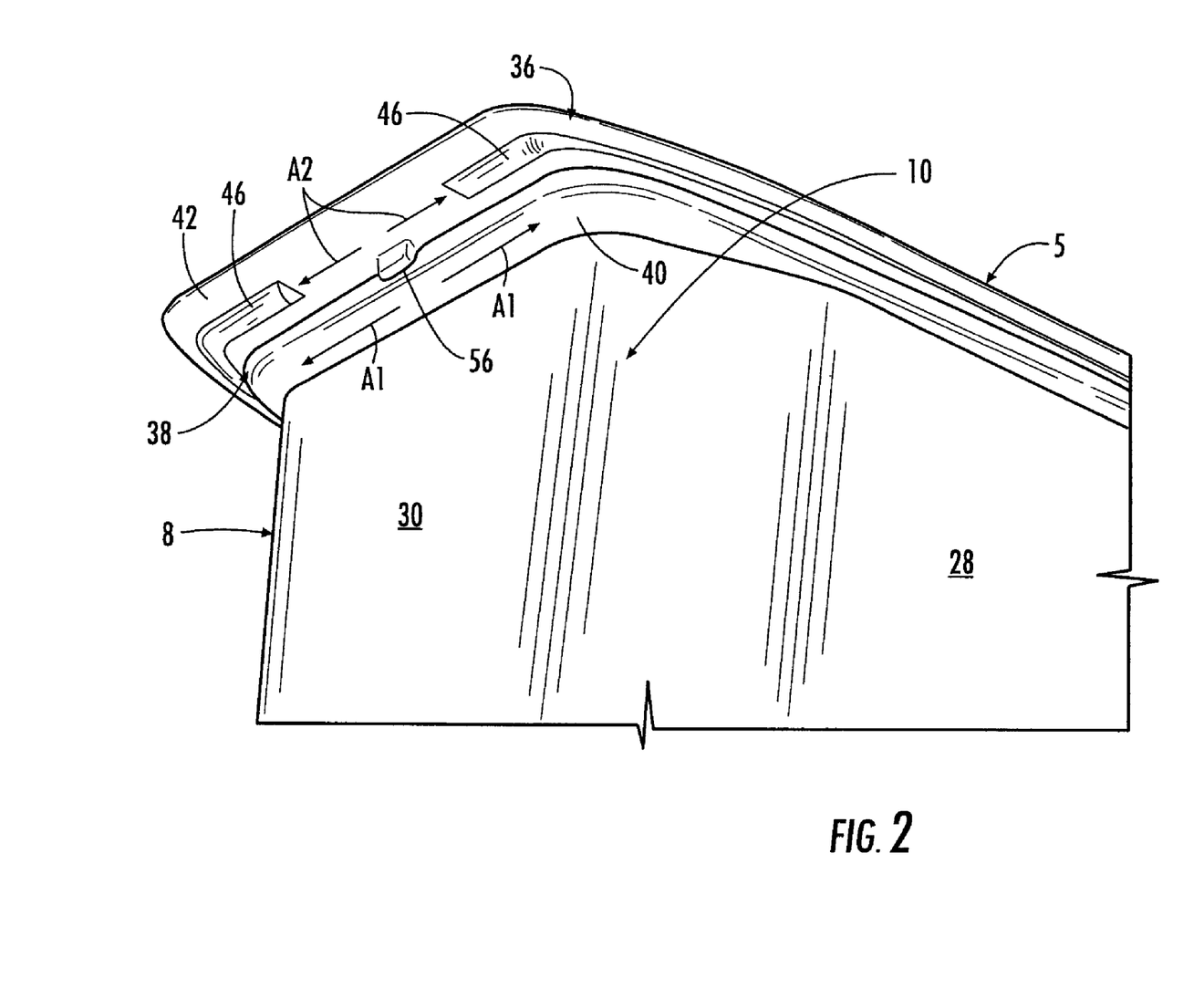
FIG. 2 is a detail view of a portion of the container.

In accordance with one embodiment, flow of the fluid molding material is controlled in a manner that seeks to keep the material contained to the underside of the flange of the container. The arrows A1, A2 drawn onto the structure 38 in FIG. 2 schematically illustrate the directions in which some of the fluid molding material flows to form the structure. As will be discussed in more detail herein, the longer arrows A1 generally indicate the flow of injection molding material forming the base portion 40 of the structure 38 and the shorter arrows A2 generally indicate the flow of injection molding material forming the distal portion 42 of the structure. The arrows A1 are longer than the arrows A2 to indicate that the flow rate of injection molding material forming the base portion 40 is generally greater than the flow rate of injection molding material forming the distal portion 42 of the structure 38. The structure 38 may be formed by other flow patterns and flow rates without departing from the invention.

In accordance with other embodiments, different techniques can be used to form the injection-molded structure 38.

As one example, the container can be formed from a blank having moveable end panels and side panels that have overlapping edges as discussed in the '178 application. Further, a single injection point could be used to inject fluid molding material into the mold assembly (e.g., mold assembly 130), or more than two injection points can be used.

Figure 5:
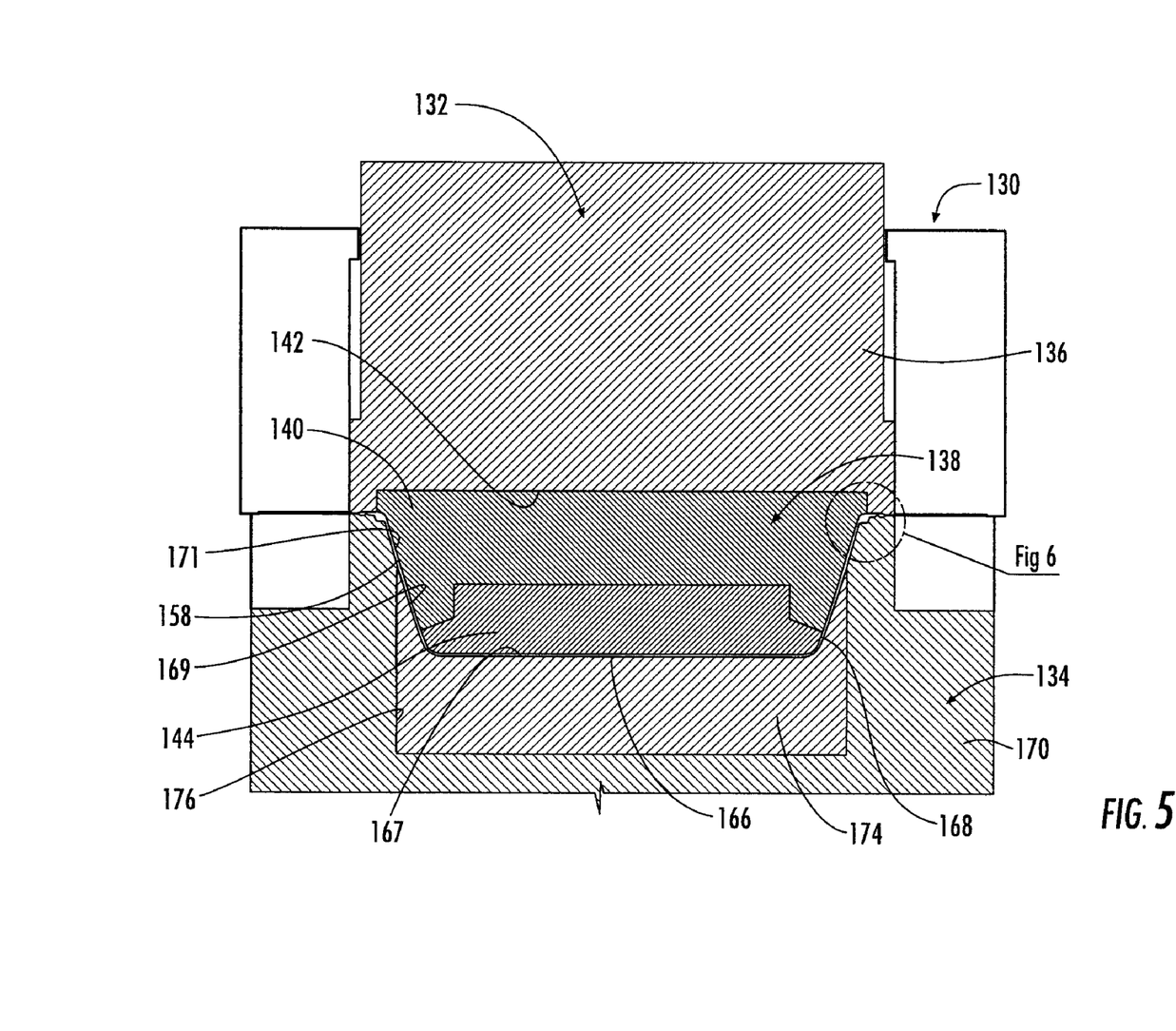
FIG. 5 is a schematic cross-sectional view of a mold assembly in a closed configuration.
Figure 6:
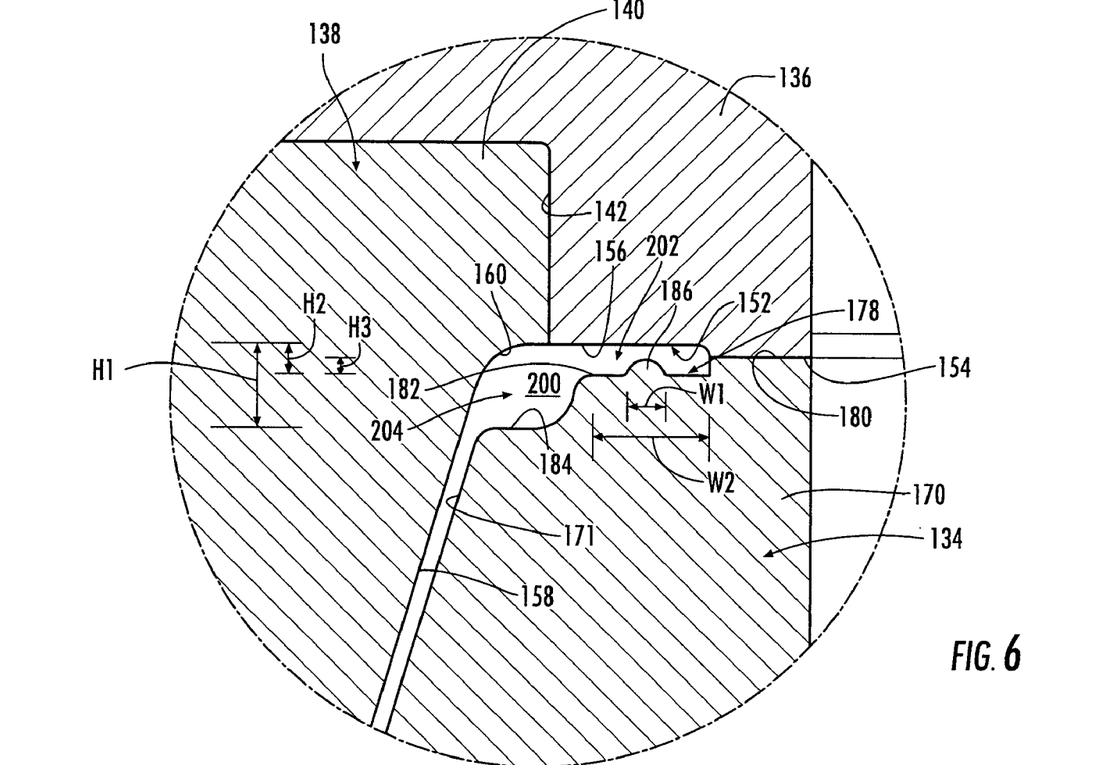
FIG. 6 is an enlarged portion of FIG. 5.
Figure 7:
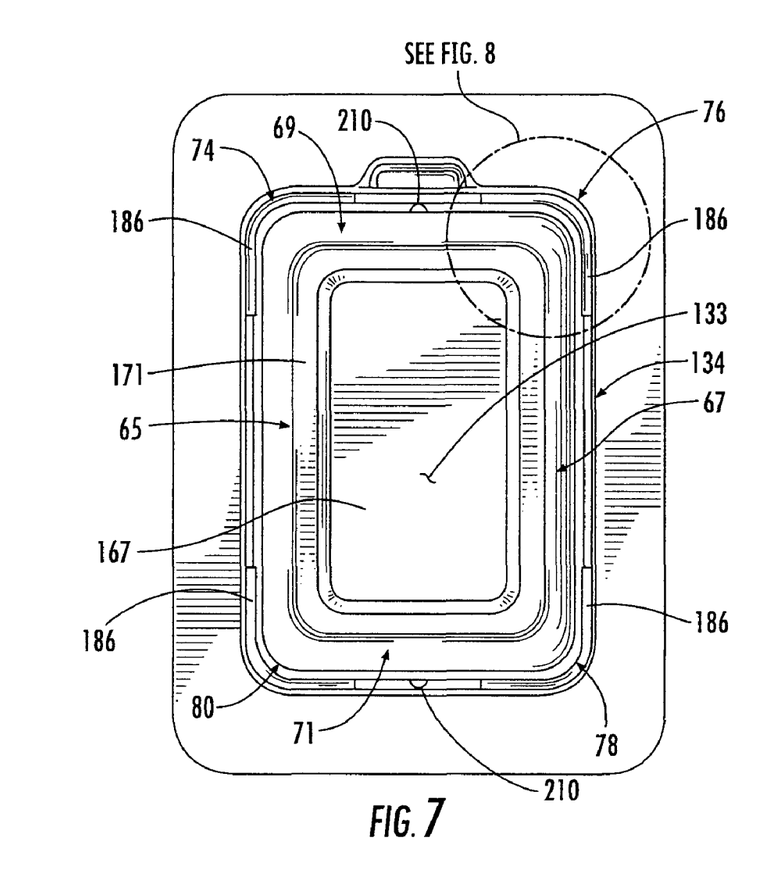
FIG. 7 is a top plan view of a female mold of the mold assembly.
Figure 8:
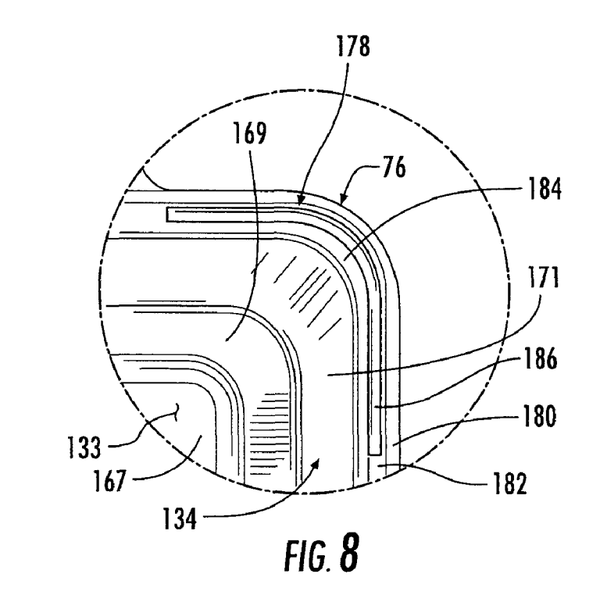
FIG. 8 is an enlarged portion of FIG. 7.

FIGS. 5-10 schematically illustrates a forming tool (e.g., mold assembly 130) that can be used in the manufacture of the container, in accordance with the illustrated embodiment. The mold assembly 130 is in a closed configuration in FIG. 5, and it includes a male mold 132 and a female mold 134. As shown in FIG. 7, the female mold 134 includes a cavity 133 that is generally shaped to correspond with the shape of the container 2. In the illustrated embodiment, the cavity 133 includes two opposed, inclined side walls 65, 67, two opposed, inclined end walls 69, 71, and four corners 74, 76, 78, 80 respectively positioned at the junctions of the side walls and end walls. In the illustrated embodiment, the male mold 132 is shaped to generally correspond to the shape of the cavity 133 to form the container 2 when a generally flat blank is pressed into the cavity. The male mold 132 and/or the female mold 134 may be otherwise shaped and/or arranged without departing from the invention.

As shown in FIG. 5, in the illustrated embodiment, the male mold 132 includes an outer mold 136 to which a nose unit 138 is mounted. The nose unit 138 may be moveably mounted to the outer mold 136, the nose unit may be fixedly attached to the outer nose, or the nose unit and outer mold may be a single piece without departing from the invention. In the illustrated embodiment, the nose unit 138 includes a first part 140 received in a cavity 142 of the outer mold 136 and a second part 144 forming the distal end of the nose unit. The second part 144 of the nose unit 138 can be moveably attached to the first part 140 or the second part can be fixedly attached to the first part without departing from the invention. Further, the nose unit 138 may be a single part without departing from the invention.

As shown in FIG. 6, the outer mold 136 includes a lower surface 152 adjacent the cavity 142 including a radially outer surface 154 and a radially inner surface 156 adjacent the cavity. The radially outer surface 154 is for contacting the female mold 134 in the closed position of the mold assembly 130. The radially inner surface 156 is for receiving the flange 36 when the container 2 is formed in the mold assembly 130.

In the illustrated embodiment, the first part 140 of the nose unit 138 includes an angled external surface 158 extending upward from the second part 144. An upper portion of the external surface 158 includes a rounded corner 160 adjacent the radially inner surface 156 of the outer mold 136. The second part 144 of the nose unit 138 has a flat external surface 166 at the distal end of the nose unit and an angled external surface 168 extending up from the flat surface. In the illustrated embodiment, the external surface 168 of the second part 144 is angled approximately the same angle as the external surface 158 of the first part 140 so that the adjacent surfaces form a substantially continuous forming surface of the male mold 132. The external surface 158 of the first part 140 of the nose unit 138 and the external surface 168 of the second part 144 are for forming the sidewalls 26, 28 and end walls 30, 32 of the container 2 when the container is formed in the mold assembly 130. The flat external surface 166 of the nose unit 138 is for forming the base panel 24 of the container 2 when the container is formed in the mold assembly 130. The male mold 132 may have other surfaces for forming the container 2 and may be otherwise shaped and/or arranged without departing from the invention.

In the illustrated embodiment, the female mold 134 includes an outer mold 170 and an inner mold 174. In one embodiment, the inner mold 174 is moveably mounted within a cavity 176 of the outer mold 170. Alternatively, the inner mold 174 can be fixedly attached to the outer mold 170, or the outer mold and inner mold may be combined to form a one-piece female mold without departing from the invention. The inner mold 174 includes a substantially flat bottom surface 167 and an angled surface 169 extending up from the bottom surface. The outer mold 170 includes an angled surface 171 extending up from the angled surface 169 when the mold assembly 130 is positioned as shown in FIG. 5 (e.g., when the inner mold 174 is fully seated in the cavity 176 of the outer mold). In the illustrated embodiment, the angled surface 169 of the outer mold 170 is angled approximately the same angle relative to the bottom surface 167 as the surface 171 of the outer mold 170 so that the adjacent surfaces form a substantially continuous forming surface of the female mold 134. The bottom surface 167 and angled surfaces 169, 171 as least partially form the cavity 133 of the female mold 134. The angled surface formed by the surfaces 169, 171 of the inner and outer molds 174, 170 are generally parallel and spaced apart from the external surface formed by the surfaces 158, 168 of the male mold 132 in the closed position of the mold assembly 130 (e.g., fully inserted position of FIG. 5).

As shown in FIG. 6, the outer mold 170 has an upper surface 178 that includes a radially outer surface 180 at the laterally outer portion of the mold for contacting the radially outer surface 154 of the male mold 132 in the closed position of the mold assembly 130. The upper surface 178 has a first shoulder 182 adjacent to and spaced laterally inward from the radially outer surface 180. The upper surface 178 has a second shoulder 184 adjacent to and spaced laterally inward from the first shoulder 182. In the illustrated embodiment, the upper surface 178 is shaped so that the radially outer surface 180 is the highest surface, the first shoulder 182 is recessed from the radially outer surface and is located intermediate the radially outer surface and second shoulder 184, and the second shoulder 184 is recessed from the first shoulder 182. In the illustrated embodiment, the first shoulder 182 includes four protrusions 186 (one of which is shown in FIG. 6) extending around a respective corner 74, 76, 78, 80 (FIGS. 7 and 8) of the female mold 134. The protrusions 186 are for positioning the flange 36 of the container 2 against the surface 156 of the male mold 132 when the container is formed in the mold assembly 130. The protrusions 186 press the flange 36 against the surface 156 and form a respective indentation 46 in the injection-molded structure 38 of the container 2. In the illustrated embodiment the protrusions 186 are rounded and have a lateral width W1 less than the lateral width W2 of the first shoulder 182.

As shown in FIG. 6, the first shoulder 182 and second shoulder 184 of the female mold 134 are spaced apart from the surface 156 of the male mold 132 to form an injection cavity 200 when the male mold is fully inserted into the female mold. In the illustrated embodiment, the adjacent first shoulder 182 and second shoulder 184 of the female mold 134 form a first surface, and the surface 156 and the rounded corner 160 of the external surface 158 of the male mold 134 form a second surface, the first and second surfaces being cooperating surfaces that form the injection cavity 200. The injection cavity 200 includes a laterally outer portion 202 in the space between the first shoulder 182 of the female mold and the surface 156 of the male mold. The injection cavity 200 includes a laterally inner portion 204 in the space between the second shoulder 184 of the female mold 134 and a portion of the surface 156 and a portion of the upper surface 158 of the male mold including the rounded corner 160. In the illustrated embodiment the inner portion 204 of the injection cavity 200 has a maximum height H1 greater than a maximum height H2 of the outer portion 202 of the cavity. The larger size and cross-sectional area of the inner portion 204 of the cavity 200 causes injection-molded material to flow more rapidly at the inner portion of the cavity so that the inner portion forms an advanced-flow section of the injection cavity 200. The smaller size and cross-sectional area of the outer portion 202 of the cavity 200 causes injection-molded material to flow less rapidly than the injection molded material in the inner portion 204 of the cavity so that the outer portion of the cavity forms a delayed-flow section.

When the structure 28 is formed, the injection-molding material will form a flow-front in the advanced flow section 204 of the injection cavity 200 that advances from the valve gate 210 around the perimeter of the container 2 more rapidly than a flow-front formed in the delayed flow section 202 of the injection cavity. As noted above and illustrated in FIG. 2, the flow of injection-molding material in the advanced-flow section 204 is generally indicated by the arrows A1, and the flow of injection-molding material in the delayed-flow section 202 is generally indicated by the arrows A2. The more rapid flow of the injection-molded material in the advanced-flow section 204 of the cavity 200 assists in preventing the flow of injection-molding material onto the top surface of the flange 36 by holding the flange against the surface 156 of the male mold 132 prior to injection-molded material flowing into the delayed-flow section 202 of the cavity. In accordance with the embodiment shown in the drawings, the protrusions 186 initially press and hold the flange 36 against the surface 156 prior to the flow of injection-molded material into the delayed-flow section. The flow of injection-molding material in the advanced-flow section 204 supplements the holding features of the protrusions 186. Because the flange 36 of the container 2 of the illustrated embodiment is initially pressed against the male mold 132, injection molded material is generally/typically prevented from flowing between the top surface of the flange and the surface 156 of the male mold. In this way, the injection-molding material is substantially contained to the underside of the flange 36 and the upper surface of the flange remains substantially free of injection-molded material when the structure 38 is formed. Alternatively, the injection cavity 200 could be otherwise shaped to allow injection molded material to at least partially contact the lateral edge 44 of the flange 36 and/or to partially contact the upper surface of the flange.

In one embodiment, the height H1 of the inner portion 204 of the injection cavity 200 is at least approximately 0.08 inch (2.0 mm) and the height H2 of the outer portion 202 of the cavity is at least approximately 0.04 inch (1.0 mm). The protrusion 186 may have a height H3 of at least approximately 0.02 inch (0.5 mm) and a width W1 of at least approximately 0.045 inch (1.1 mm). The first shoulder 182 of the surface 178 of the female mold may have a width W2 of at least approximately 0.15 inch (3.8 mm). The base portion 40 of the structure 38 may have a thickness T1 of at least approximately 0.07 inches (1.8 mm) and the distal portion 42 of the structure 38 may have a thickness T2 of at least approximately 0.03 inches (0.8 mm). The dimensional information presented herein is intended to be illustrative of exemplary embodiments of the invention and is not intended to limit the scope of the invention.

The blank 212 is initially larger than the cavity 133 and has marginal portions extending outward beyond the cavity. The mold assembly 130 can include one or more clamp rings (not shown) that assist in the collection of the folds or pleats in the corners of the blank 212, corresponding with the corners 4, 6, 8, 10 of the container formed from the blank, as the flat blank is formed into a three-dimensional container. The clamp rings help guide the blank 312 into the cavity 133. The clamp rings can be actuated simultaneously with actuation of the male and/or female mold 132, 134 by operating actuators operatively attached to the clamp rings to apply compression force against the marginal portions of the blank 212 during formation of the blank into the container.

Figure 9:
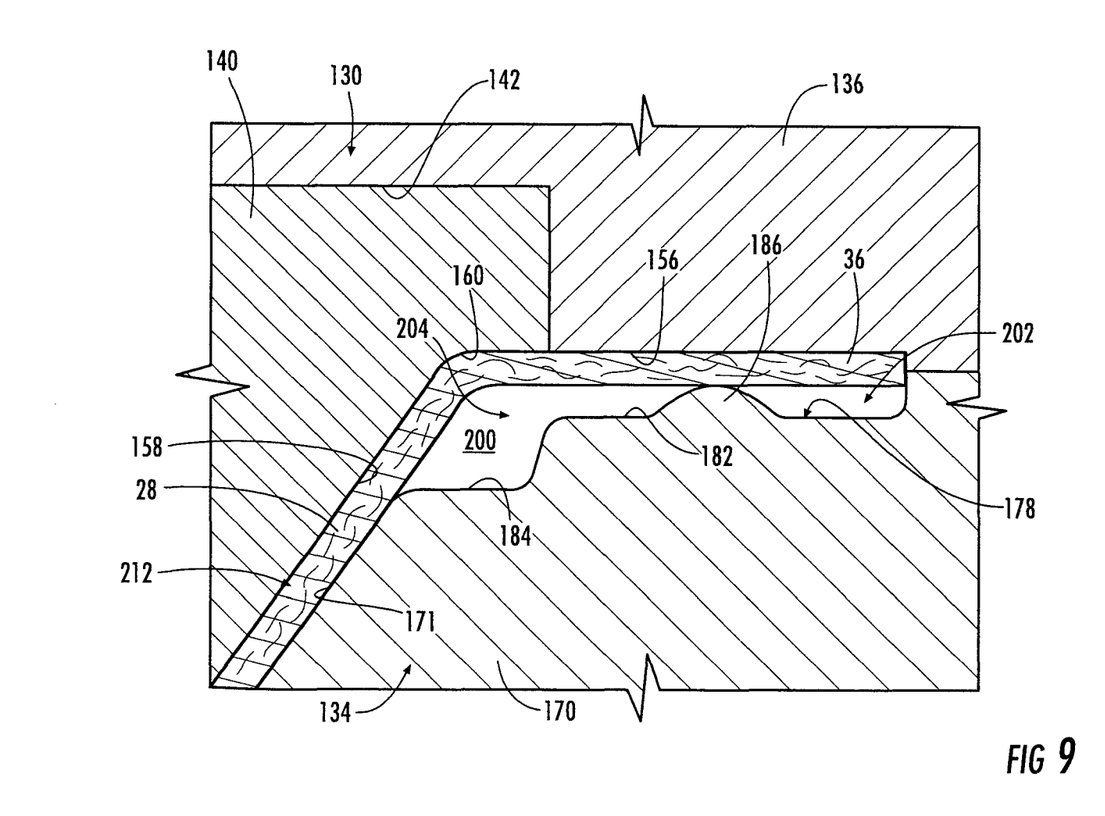
FIG. 9 is a view similar to FIG. 6 but with the container shown in the tool.

An exemplary method of forming the container 2 using the mold assembly 130 and a blank 212 (FIG. 9) is described in the following. In an initial step, the blank 212 is positioned on the female mold 134 and is press-formed into the container 2 by closing the male mold 130 such that the male mold is at least partially received in the cavity 133 of the female mold. Alternatively, the female mold 134 could be moved relative to the male mold 132 without departing from this invention. As shown in FIG. 9, the outer portion of the blank 212 corresponding to the flange portion 36 of the container 2 is held against the surface 156 of the male mold 132 by the protrusion 186 on the first shoulder 182 of the female mold 134 as the blank is press-formed by the engagement of the male mold and the female mold. As a result, the blank 212 is in an erected state within the cavity 133 of the mold assembly 130 when the mold assembly 130 achieves the fully closed configuration partially illustrated in FIG. 9.

Figure 10:
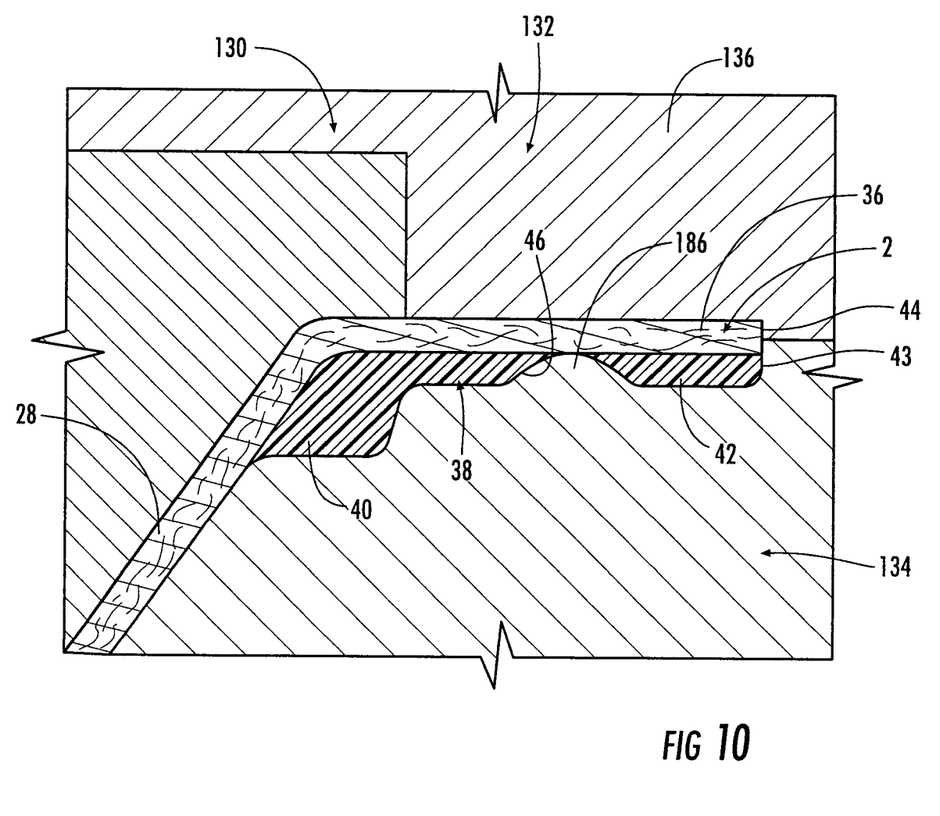
FIG. 10 is a view similar to FIG. 9 but with an injection-molded structure formed in the mold assembly.

In the fully closed configuration of the mold assembly 130 shown in FIG. 9, the injection cavity 200 is shaped to define the advanced-flow section 204 and delayed-flow section 202, which are for having a injection-molding material (e.g., fluid polymeric material) flow therein. These channels 202, 204 at least generally correspond to the shape of the injection-molded structure 38, although at least some of the channels expand during the injection molding due to movement of respective portions of the blank while the molding material flows within the channels. As shown in FIG. 10, the base portion 40 of the structure 38 is formed in the advanced-flow section 204 of the injection cavity 200 and the distal portion 42 is formed in the delayed-flow section 202 of the injection cavity. The indentation 46 in the structure 38 is formed by the protrusion 186 in the delayed-flow section 202 that prevents the flow of injection molding material in the space corresponding to the protrusion.

In one example, the liquid molding material is a polymer that is injected into the closed mold assembly 130 via the ports 210 at respective ends of the mold assembly, with the injected polymer being at a temperature of about 500 degrees Fahrenheit (260 degrees Celsius) and a pressure of approximately 2000 lb/in2 (141 Kg/cm2). The injection temperature and pressure may depend upon the polymer that is injected, and a wide variety of polymers, temperatures and pressures are within the scope of the present invention. For example and not for the purpose of limiting the scope of the present invention, suitable polymers for being injected may be polypropylene, nylon and polyethylene terephthalate (PET). In one example, the liquid molding material is polypropylene that is injected into the closed mold assembly 130 via the ports 210, with the injected polypropylene being at a temperature of about 450 degrees Fahrenheit (232 degrees Celsius) and a pressure of approximately 1750 lb/in2 (123 Kg/cm2). The polymeric liquid molding material that is injected into the closed mold assembly 130 via the ports 210 may include one or more additives, such as short glass fibers. Impregnating the polymeric liquid molding material with short glass fibers can help to advantageously control/minimize shrinkage of the solidifying polymeric material. The polymeric liquid molding material may include about 30% glass fibers by weight, although other amounts and other additives are also within the scope of the present invention.

After the liquid injection-molding material solidifies so that the container 2 is formed within the mold assembly 130 (FIG. 10), the mold assembly is opened and the container is removed. Thereafter, the mold assembly 130 can be used to manufacture another container.

In accordance with one embodiment, after the container 2 is formed, food can be placed in the container's cavity 9, and then the cavity can be closed such as in a leakproof manner (e.g., with a cover in the form of a polymeric overwrap that can be heat sealed or otherwise attached to the flange 36, or by other closing arrangements and materials). Alternatively, the container can be closed with lids made of paperboard, foil or any other suitable material. A variety of mechanisms for closing the opening of the container, such as in a leakproof or nonleakproof manner, are within the scope of the present invention.

In one aspect, for example, where a rigid or semi-rigid construct is to be formed, all or a portion of the container 2 may be formed at least partially from a paperboard material, which may be cut into a blank prior to use in the construct. For example, the container 2 may be formed from paperboard having a basis weight of from about 60 to about 330 lbs/ream, (about 27 to about 148 Kg/ream wherein a ream equals 3,000 ft2 or 279 m2), for example, from about 80 to about 140 lbs/ream (about 36 Kg/ream to about 63 Kg/ream). The paperboard generally may have a thickness of from about 6 to about 30 mils, for example, from about 12 to about 28 mils. In one particular example, the paperboard has a thickness of about 12 mils. Any suitable paperboard may be used, for example, a solid bleached or solid unbleached sulfate board, such as SUS® board, commercially available from Graphic Packaging International.

In another aspect, where a more flexible construct is to be formed, the container may comprise a paper or paper-based material generally having a basis weight of from about 15 to about 60 lbs/ream (about 6.75 Kg/ream to about 27 Kg/ream), for example, from about 20 to about 40 lbs/ream (about 9 Kg/ream to about 18 Kg/ream). In one particular example, the paper has a basis weight of about 25 lbs/ream (about 11 Kg/ream).

Optionally, one or more portions of the blank or other constructs described herein or contemplated hereby may be coated with varnish, clay, or other materials, either alone or in combination. The coating may then be printed over with product advertising or other information or images. The blanks or other constructs also may be selectively coated and/or printed so that less than the entire surface area of the blank or substantially the entire surface area of the blank may be coated and/or printed.

The foregoing description illustrates and describes various embodiments of the disclosure. As various changes could be made in the above construction, it is intended that all matter contained in the above description or shown in the accompanying drawings shall be interpreted as illustrative and not in a limiting sense. Furthermore, various modifications, combinations, and alterations, etc., of the above-described embodiments are within the scope of the claims. Additionally, the disclosure shows and describes only selected embodiments, but various other combinations, modifications, and environments are within the scope of the claims, commensurate with the above teachings, and/or within the skill or knowledge of the relevant art. Furthermore, certain features and characteristics of each embodiment may be selectively interchanged and applied to other illustrated and non-illustrated embodiments without departing from the scope of the disclosure.

What is claimed is:

1. An apparatus for at least partially forming a container from a blank, the container having a flange extending around a top of the container, the apparatus comprising:
    a female mold that includes a cavity for at least partially receiving the blank;
    a male mold operatively associated with the female mold, the male mold being operable to move within the cavity to least partially form the blank into the container;
    an injection cavity respectively formed between cooperating surfaces of the female mold and the male mold, the injection cavity being for receiving material for forming an injection-molded structure extending along at least a portion of the flange; and
    a protrusion on at least one of the cooperating surfaces of the female mold and the male mold, the protrusion being for positioning the flange prior to forming the injection-molded structure, wherein the injection cavity comprises an advanced-flow section and a delayed-flow section around the protrusion.

2. The apparatus of claim 1 wherein the at least one cooperating surface includes a first shoulder including a laterally outer portion of the surface and a second shoulder including a laterally inner portion of the surface, the protrusion being formed on the first shoulder.

3. The apparatus of claim 2 wherein the protrusion is formed on the female mold for positioning the flange against the cooperating surface of the male mold when the blank is formed into the container.

4. The apparatus of claim 3 wherein the first shoulder is spaced apart from the cooperating surface of the male mold a smaller distance than the second shoulder.

5. The apparatus of claim 4 wherein the advanced-flow section is arranged between the second shoulder and the cooperating surface of the male mold and the delayed-flow section is arranged between the first shoulder and the cooperating surface of the male mold.

6. The apparatus of claim 1 wherein the protrusion divides the delayed-flow section of the tool into a first portion adjacent the advanced-flow section and a second portion adjacent a lateral edge of the flange.

7. The apparatus of claim 5 wherein the advanced-flow section has a greater cross-sectional area than the delayed-flow section.

8. A method of manufacturing a container, the method comprising:
    closing a blank in a forming tool so that the blank is formed into a container that is at least partially contained in the closed forming tool, wherein the forming tool comprises a female mold that includes a cavity and a male mold operatively associate with the female mold, the female mold and the male mold having respectively opposed cooperating surfaces that respectively form an injection cavity, at least one of the cooperating surfaces has a protrusion, and the closing of the blank in the forming tool comprises
    engaging a first part of the male mold against a portion of the blank,
    thereafter using at least the first part of the male mold to at least partially force the portion of the blank into the cavity of the female mold to partially form the container,
    closing the forming tool to form a flange of the container,
    engaging the flange with the protrusion to force the flange against one of the cooperating surfaces, the closing of the forming tool forming an injection cavity between the cooperating surfaces, wherein the injection cavity comprises an advanced-flow section and a delayed-flow section around the protrusion, and forming an injection-molded structure by introducing injection-molded material into the injection cavity.

9. The method of claim 8 wherein forming the injection-molded structure comprises flowing material into the advanced-flow section and thereafter flowing material into the delayed flow section.

10. The method of claim 9 wherein the protrusion is in the delayed-flow section of the cavity and forming the injection-molded structure comprises forming an indentation in the injection molded structure, the indentation corresponding with the location of the protrusion in the cavity.

11. The method of claim 9 wherein the advanced-flow section has a greater cross-sectional area than a cross-sectional area of the delayed flow section.

12. The method of claim 9 wherein engaging the flange with the protrusion seals the flange against the cooperating surface to substantially prevent the flow of injecting material between the cooperating surface of the male mold and the flange.

13. The method of claim 12 wherein the flowing of material into the advanced-flow section assists in sealing the flange against the cooperating surface of the male mold.

14. The apparatus of claim 6 wherein the injection cavity is defined by an end wall for forming a lateral edge of the injection-molded feature, the second portion of the delayed-flow section being between the protrusion and the end wall.

15. The method of claim 10 wherein the protrusion divides the delayed-flow section of the tool into a first portion adjacent the advanced-flow section and a second portion, the injection cavity is defined by an end wall and the protrusion is spaced apart from the end wall, the forming the injection-molded structure comprises forming a lateral edge of the injection molded structure at the end wall.

* * * * *